(12) United States Patent
Wiersma

(10) Patent No.: US 6,901,696 B2
(45) Date of Patent: Jun. 7, 2005

(54) METHOD OF PLANT PROPAGATION USING ROOT BARK-GRAFTING TO SECTIONS

(76) Inventor: Roy Henry Wiersma, 5387 Topaz St., Alta Loma, CA (US) 91701

(*) Notice: Subject to any disclaimer, the term of this patent is extended or adjusted under 35 U.S.C. 154(b) by 0 days.

(21) Appl. No.: 10/304,450

(22) Filed: Nov. 25, 2002

(65) Prior Publication Data

US 2004/0098907 A1 May 27, 2004

(51) Int. Cl.$^7$ .............................................. A01G 1/06
(52) U.S. Cl. .................................................... 47/6
(58) Field of Search ......................... 47/6, 17

(56) References Cited

U.S. PATENT DOCUMENTS

| | | |
|---|---|---|
| 1,594,548 A | 8/1926 | Nixon |
| 2,048,056 A | 7/1936 | Boehm |
| 2,523,600 A | 9/1950 | Stark, Jr. |
| 3,645,041 A | 2/1972 | Addin |
| 4,012,866 A | 3/1977 | Brokaw |
| 4,138,801 A | 2/1979 | Anadoliev |
| 4,154,020 A | 5/1979 | Paz et al. |
| 4,516,353 A * | 5/1985 | Cummins et al. ........... 800/315 |
| 4,937,971 A | 7/1990 | Collas et al. |
| 4,944,115 A | 7/1990 | Patrucco |
| PP9,068 P | 3/1995 | Caudle et al. |
| PP11,233 P | 2/2000 | Jacob |
| 2004/0098907 A1 * | 5/2004 | Wiersma ....................... 47/7 |

FOREIGN PATENT DOCUMENTS

| | | | |
|---|---|---|---|
| EP | 0132287 A1 | 1/1985 | |
| JP | 4-40828 | * 2/1992 | ............ A01G/1/06 |
| WO | WO 97/396616 | * 10/1997 | ............ A01G/1/06 |

OTHER PUBLICATIONS

Powell. 1998. Budding and Grafting Fruits and Nust. ANR–402. at http://www.aces.edu/puds/docs.*

Mooney et al. 1997. Topworking of Citrus Trees by Bark Grafting. The Horticultural and Food Research Institute of New Zealand. at http://www.hortnet.co.nz/publications/science.*

* cited by examiner

Primary Examiner—Jeffrey L. Gellner
(74) Attorney, Agent, or Firm—Gene Scott; Patent Law & Venture Group

(57) ABSTRACT

A grafting method comprises the steps of, first preparing a stool by right transverse cuts through a limb or trunk, meaning that the limb or trunk of a tree or shrub is cut at essentially right angles. Root and scion stocks are grafted to the stool using the well known bark grafting technique. The stool is then placed into a rooting medium with the grafted root stock immersed in the medium. Appropriate heat and water is made available to ensure that the root stock is established and that sufficient nutrients and moisture is conducted to the scion stock through the stool.

11 Claims, 2 Drawing Sheets

METHOD OF PLANT PROPAGATION USING ROOT BARK-GRAFTING TO SECTIONS

INCORPORATION BY REFERENCE

Applicant(s) hereby incorporate herein by reference, any and all U.S. patents, U.S. patent applications, and other documents and printed matter cited or referred to in this application.

BACKGROUND OF THE INVENTION

1. Field of the Invention

This invention relates generally to plant propagation methods using grafting and more particularly to a technique of providing scion viability using bark grafting of roots to a stool.

2. Description of Related ART

The following art defines the present state of this field:

Caudle et al., U.S. Plant 9,068 describes a new variety of apple tree of unknown parentage, bearing apples of exceptional shelf life and keeping quality, exhibiting distinctive fruit coloration and shape, a long stem, large leaves, and unused bore shoot and bud extension.

Jacob, U.S. Plant 11,233 describes *Prunus pumila* variety 'Rhenus 2' is a dwarfing rootstock that is compatible with *Prunus* varieties such as peach, nectarine, and apricot, producing dwarf trees with no significant reduction in fruit size, early yield, high yield efficiency, uniform fruit size, high frost hardiness, no suckering, and good soil adaptation.

Nixon, U.S. Pat. No. 1,594,548 describes the art of tree propagation which comprises grafting a scion having buds thereon on a root, encircling the scion just above the graft with a member adapted, in the normal expansion of a diameter of the scion during growth, to substantially constrict the same, and planting the grafted scion at such depth that the zone of constriction is substantially below the ground level with buds between the constriction and the round level, whereby, in the course of plant growth, the food supply to the grafted root will be cut down, while submerged tissue in the vicinity of the buds below the ground level will put out its own roots, thus producing a grafted tree having its own root system.

Boehm, U.S. Pat. No. 2,048,056 describes a method of hybridizing plants which consists in grafting a scion to a stock whereby there is produced in the vicinity of the line of union between the stock and the scion and area of growth wherein the protoplasm of the stock and the protoplasm of the scion are mixed and then preventing the growth of limbs from any other area than the influenced by the said mixture of protoplasm.

Stark, Jr., U.S. Pat. No. 2,523,600 describes a method of propagating representative individual plant varieties which comprises the step of simultaneously grafting together a plurality of desired friuting varieties to form a graft unit and grafting such composite unit on a hardly sturdy stock and root system.

Addin, U.S. Pat. No. 3,645,041 describes healthy, vigorous pear tress that are produced from pear tree slips by treating the bottom section of the slips with an aqueous slurry of proteins and trace quantities of amino acids and then planting the slips directly into a plant growth medium. The resulting trees are usually resistant to pear tree diseases, sustain growth rates which compare favorably with grafted trees, and have significantly lower mortality rates in advanced stages of growth.

Brokaw, U.S. Pat. No. 4,012,866 describes a method of root stock propagation involving positioning a collar loosely about a root stock grown from a bud grafted to a seedling wherein the bud is from a clone having desired characteristics. A fruiting scion may be grafted to the root stock such that after controlled growth, the seedling, root stock, collar and fruiting scion if attached, may be transplanted as a body. The root stock grows to a size inside the collar causing the collar to gradually constrict flow of nutrients to the seedling and promotes rooting of the root stock itself while gradually destroying its vascular connection to the seedling. The seedling finally disintegrates and there is left a properly rooted plant having the desired characteristics determined by the bud from the clone.

Anadoliev, U.S. Pat. No. 4,138,801 describes a method of obtaining engrafted engrafting material from a giant filbert tree. Engrafting takes place on Turkish filbert shoots and afterwards the shoots engrafted are stratified in a neutral granular medium preferably composed of swelled perlite, the temperature being maintained at about 35–38 degrees C. in the room throughout the first 6–7 days and at about 25–28 degrees C. during the following 15–18 days. The relative air humidity is maintained at about 70–75%. Just before taking out the material, it is held for a few days at ambient temperature, that is, about 16–18 degrees C.

Paz et al, U.S. Pat. No. 4,154,020 describes an improved rose plant propagation process which can be carried out on an expeditious basis. Stem segments from a scion rose plant and an understock rose plant are obtained during an active stage of growth. An end of a scion segment is placed into a cut formed in an understock segment, and an end portion of the understock segment is placed in a rooting medium. Roots simultaneously are formed on the understock segment while a graft union between the scion and understock rose plant stem segments is formed. The portion of the understock stem above the graft union next is removed. The process of the present invention offers a reliable rose plant propagation technique not heretofore available to the rose industry whereby quality new rose plants readily can be formed on an economical basis in a significantly shorter period of time than commonly required for prior rose plant propagation techniques.

Collas et al., U.S. Pat. No. 4,937,971 describes starting from a herbaceous cutting, which may be derived from in vitro culture, of stock and of a herbaceous scion, the process consists of inserting the scion (12') having a single bud, into the stock cutting (12), by bevelling the lower end 15 of the scion 12' from two sides 17, 18, by slitting the upper end of the stock cutting in its middle, and by subsequently assembling the two parts 12, 12' by joining 20, of transferring the base of the abovementioned grafted unit into a development medium 21, of moistening the development medium 21 with a nutrient solution and of subsequently placing this unit in a container with a water-saturated atmosphere and at a temperature above 20 degree. C., while suppressing the bud 22 of the stock and growing the saplings in the greenhouse or under a polyethylene tunnel until the desired stage of growth.

Patrucco, U.S. Pat. No. 4,944,115 describes A process for the multiplication of plant varieties which comprises the following operations: grafting of the variety to be reproduced on the tendril of a mother plant at various levels; production of cuttings of said grafted tendril, and rooting of said grafted cuttings of tendril. The process allows in particular the complete "rooting" of the graft (100%), the dematerialization of the product, the intensification of the density of cultivation. It also gives a high speed of multiplication and a prolonged biological and structural preservation. The invention also includes the product obtained through the process.

National Research Development Corp., EP 0132287 describes a rooted shoot of a rootstock (obtained from a stoolbed or from one or other sort of cutting) that is planted in a nursery at relatively shallow depth (often about 8 inches). A scion is next grafted on to the rootstock and part of the rootstock above ground is wrapped in black polythene to produce localised blanching. The plant is then left in the nursery for root 'initials', and possibly some roots, to form under the polythene. After usually one year, the plant is moved to its final location in the field planted to a depth such as to immerse in the soil the stem section blanched during its period in the nursery. A similar method of initiating the desired root growth by cutting or scoring the basal section is also described.

The prior art teaches methods of propagating trees and plants, hybridizing plants, growing trees from slips, propagation of root stock, grafting cuttings of stock and scions from in vitro, multiplication of plant varieties, and anchorage of plants, but does not teach the propagation of cuttings or scions by grafting to a stool cut from limb or trunk and made viable by grafting root stock to the stool. The present invention fulfills these needs and provides further related advantages as described in the following summary.

SUMMARY OF THE INVENTION

The present invention teaches certain benefits in construction and use which give rise to the objectives described below.

The present invention is a grafting method that has been applied to mulberry trees and other plants. The method lends itself to mass production of plant species. Although the method calls for the grafting of both scion stock and root stock to branch or trunk stools, in certain plants, roots may also be made to grow from the stools or sections naturally. The prior art teaches the bark grafting of twigs or scions to stumps, such as limbs or trunks of plants, such as trees, that have been stubbed, for the propagation of the grafted plant species. However, it is not known in the art, to bark graft root stock to sections cut from a limb or trunk thereby using the section as a growth medium for the roots as well as for slips or scions. Basically, the use of stumps as a parent for grafting twigs is known, and the use of the bark grafting technique has been used for this purpose. What is not known in the art is a method, as described below, wherein a section of a limb or trunk is cut away and used in the same manner as a stump, but with root stock bark grafted to the section. Such a method is extremely valuable because it enables the use of bark grafting in a high-volume production environment.

The invention method comprises the steps of, preparing a stool by right transverse cuts through a limb or trunk, meaning that the limb or trunk of a tree or shrub is cut at essentially right angles. Root and scion stocks are grafted to the stool using the well known bark grafting technique. The stool is then placed into a rooting medium with the grafted root stock immersed in the medium. Appropriate heat and water is made available to ensure that the root stock is established and that sufficient nutrients and moisture is conducted to the scion stock through the stool.

A primary objective of the present invention is to provide an apparatus and method of use of such apparatus that provides advantages not taught by the prior art.

Another objective is to provide such an invention capable of propagating slips or scions through bark grafting techniques.

A further objective is to provide such an invention capable of supporting slips or scions using a right cut stool from a limb or trunk.

A still further objective is to provide such an invention capable of preparing a living stool as a basis for plant propagation.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the present invention. In such drawings.

DETAILED DESCRIPTION OF THE INVENTION

The above described drawing figures illustrate the invention in at least one of its preferred embodiments, which is further defined in detail in the following description.

Figure 1:
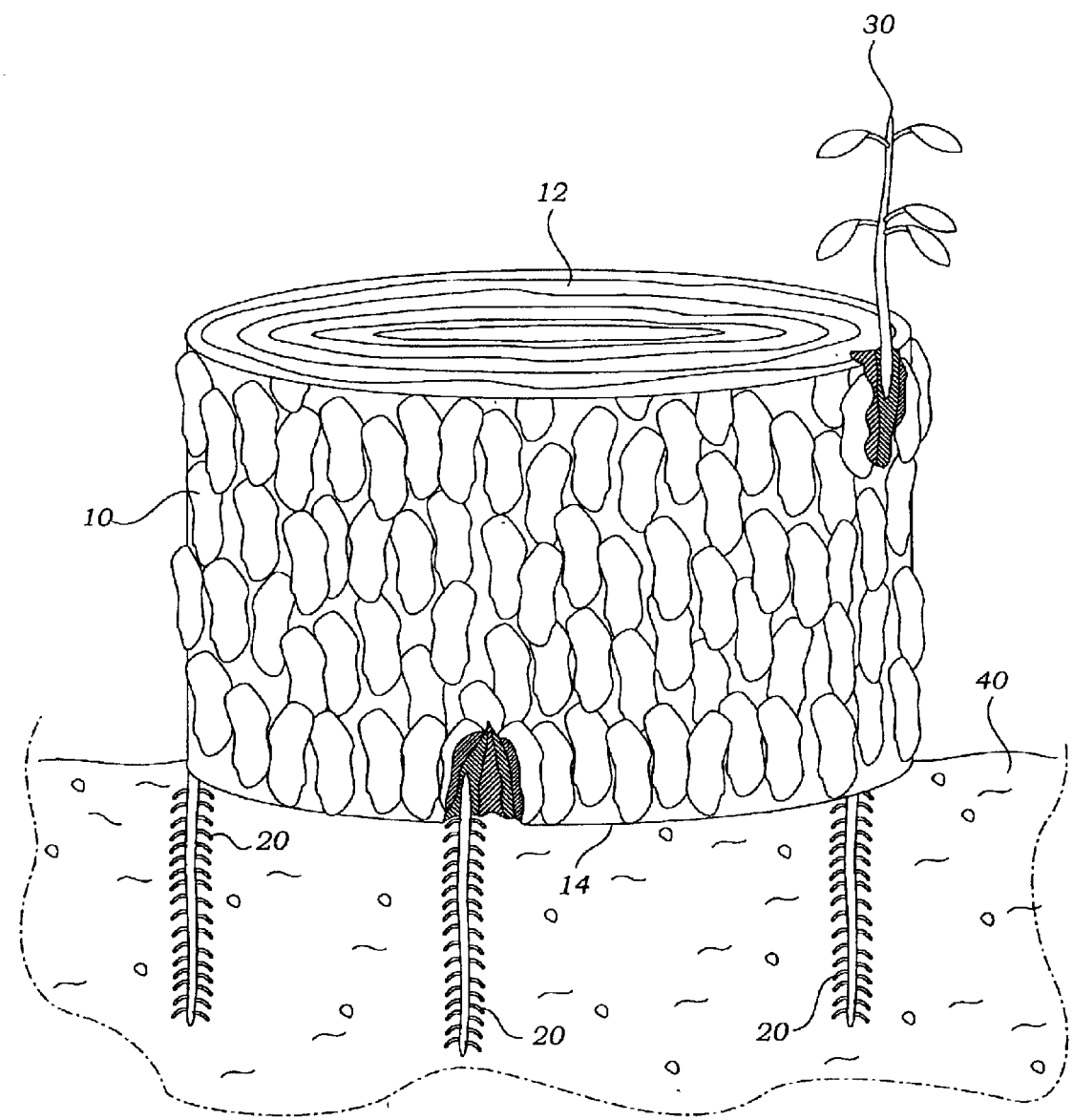
FIG. 1 is a perspective view of a first preferred embodiment of the invention.

The present invention is a grafting method comprising the steps of, first preparing a right transverse cut stool 10 from a limb or trunk, meaning that the limb or trunk of a tree or shrub is cut at essentially right angles with respect to the longitudinal axis of the limb or trunk. The word "limb" is used herein to include limbs, trunks and possibly other portions of trees or shrubs or other types of plants. This exposes two transverse cut faces 12, 14. The stool 10 is prepared with the two transverse cuts placed generally between 3 and 18 inches apart, but this should not be considered a limitation, as any length will operate as well. In the preferred embodiment, root stock 20 is grafted using the well known bark grafting technique at one cut face, preferably on the down facing side of the stool; cut face 14, as shown in FIG. 1. The down facing cut face is normally the basipetal face of the stool 10. Scion stock 30 is grafted in the same manner, on the alternate, upfacing side of the stool 10; face 12. The upfacing side is normally the acropetal cut face of the stool 10. The stool 10 is then placed with the down facing transverse cut side 14 onto a rooting medium such as a soil bed 40 with the grafted root stock 20 immersed in the rooting medium 40. Appropriate heat and water is made available to ensure that the root stock 20 is established, and that sufficient nutrients and moisture are conducted to the scion stock 30 through the stool 10.

Figure 2:
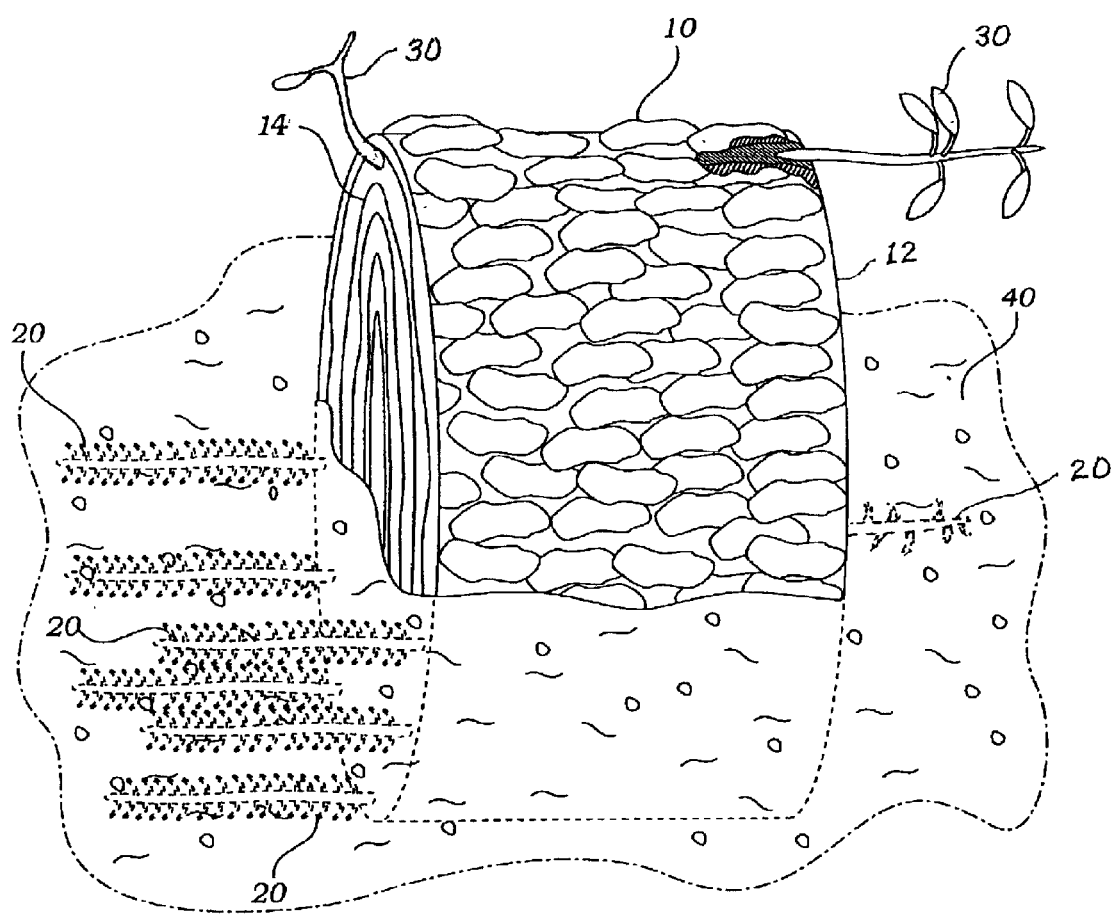
FIG. 2 is a further perspective view of a second preferred embodiment thereof.

In an alternate embodiment of the present invention, shown in FIG. 2, the root and scion stocks are grafted as before, and in this case, the root stock 20 and scion stock 30 may be grafted onto both or either of the cut faces 12, 14 of the stool 10. The method in this case comprises the steps of, first preparing the stool 10 as defined above and then, after grafting, placing the stool 10 so that at least one of the cut faces 12, 14 is partially immersed into the rooting medium 40 with the grafted root stock 20 immerged and the scion stock 30 not immerged, as shown in FIG. 2. Appropriate heat and water is made available to ensure that the root stock 20 is established, and that sufficient nutrients and moisture are conducted to the scion stock 30 through the stool 10.

Heat and plant growth regulators are preferably employed to assure root establishment and fast growth. Tenting may also be used to advantage. The main concern is to keep the stool 10 and its grafts 20, 30 at an ideal temperature to assure maximum growth rate and to promote graft healing.

While the invention has been described with reference to at least one preferred embodiment, it is to be clearly understood by those skilled in the art that the invention is not limited thereto. Rather, the scope of the invention is to be interpreted only in conjunction with the appended claims and it is made clear, here, that the inventor(s) believe that the claimed subject matter is the invention.

What is claimed is:

1. A grafting method comprising the steps of: preparing a right cut stool from one of a limb and a trunk thereby producing two opposing cut faces on the stool; bark grafting a plurality of spaced apart root stock into at least one of the cut faces thereof; placing the stool such that the root stock is in a rooting medium; and providing heat and moisture to the stool and root stock to form a beneficial growth environment and to promote graft healing.

2. The method of claim 1 wherein one of the cut faces of the stool is oriented approximately at one of; in parallel with and in orthogonal juxtaposition with a surface of the rooting medium.

3. The method of claim 1 wherein both of the cut faces of the stool are oriented approximately at right angles to a surface of the rooting medium and wherein at least the one of the cut faces is at least partially immersed in the rooting medium.

4. A grafting method comprising the steps of: preparing a right cut stool from one of a limb and a trunk thereby producing two opposing and approximately parallel cut faces on the stool; bark grafting plural, spaced apart root stock into one of the cut faces thereof; bark grafting plural, spaced apart scion stock into the other of the cut faces thereof; placing the stool such that the root stock are in a rooting medium; and providing heat and moisture to the stool and root stock to form a beneficial growth environment and to promote graft healing.

5. The method of claim 4 wherein the one of the cut faces of the stool is oriented approximately in parallel with a surface of the rooting medium.

6. The method of claim 5 wherein the one of the cut faces is a basipetal face of the stool.

7. The method of claim 4 wherein the two opposing cut faces of the stool are oriented approximately at right angles to a surface of the rooting medium and wherein at least the one of the cut faces is at least partially immersed in the rooting medium.

8. The method of claim 7 wherein the one of the cut faces is a basipetal face of the stool.

9. A grafting method comprising the steps of: preparing a right cut stool from one of a limb and a trunk thereby producing two opposing cut faces on the stool; bark grafting plural, spaced apart root stock and at least one scion stock into at least one of the cut faces thereof; placing the stool such that the root stock is in a rooting medium; and providing heat and moisture to the stool and root stock to form a beneficial growth environment and to promote graft healing.

10. The method of claim 9 wherein one of the cut faces of the stool is oriented approximately at one of; in parallel with and in orthogonal juxtaposition with a surface of the rooting medium.

11. The method of claim 9 wherein both of the cut faces of the stool are oriented approximately at right angles to a surface of the rooting medium and wherein at least the one of the cut faces is at least partially immersed in the rooting medium.

* * * * *